(12) United States Patent
Aszmann et al.

(10) Patent No.: US 8,601,035 B2
(45) Date of Patent: Dec. 3, 2013

(54) DATA STORAGE SPACE RECOVERY SYSTEM AND METHOD

(75) Inventors: Lawrence E. Aszmann, Prior Lake, MN (US); Michael J. Klemm, Minnetonka, MN (US); Michael H. Pittelko, Eden Prairie, MN (US); Mark D. Olson, Bloomington, MN (US)

(73) Assignee: Compellent Technologies, Eden Prairie, MN (US)

( * ) Notice: Subject to any disclaimer, the term of this patent is extended or adjusted under 35 U.S.C. 154(b) by 701 days.

(21) Appl. No.: 11/767,049

(22) Filed: Jun. 22, 2007

(65) Prior Publication Data

US 2008/0320061 A1 Dec. 25, 2008

(51) Int. Cl.
*G06F 12/00* (2006.01)
*G06F 17/30* (2006.01)

(52) U.S. Cl.
USPC .......................................... 707/813; 707/827

(58) Field of Classification Search
USPC .......................................... 707/813, 826, 827
See application file for complete search history.

(56) References Cited

U.S. PATENT DOCUMENTS

| | | |
|---|---|---|
| 5,331,646 A | 7/1994 | Krueger et al. |
| 5,371,882 A | 12/1994 | Ludlam |
| 5,572,661 A | 11/1996 | Jacobson |
| 5,644,701 A | 7/1997 | Takewaki |
| RE36,462 E | 12/1999 | Chang et al. |
| 6,058,489 A | 5/2000 | Schultz et al. |
| 6,070,249 A | 5/2000 | Lee |
| 6,078,932 A | 6/2000 | Haye et al. |
| RE36,846 E | 8/2000 | Ng et al. |
| 6,115,781 A | 9/2000 | Howard |
| 6,192,444 B1 | 2/2001 | White et al. |
| 6,212,531 B1 | 4/2001 | Blea et al. |
| 6,269,431 B1 | 7/2001 | Dunham |
| 6,275,897 B1 | 8/2001 | Bachmat |
| 6,311,251 B1 | 10/2001 | Merritt et al. |
| 6,353,878 B1 | 3/2002 | Dunham |
| 6,366,987 B1 | 4/2002 | Tzelnic et al. |

(Continued)

FOREIGN PATENT DOCUMENTS

| | | |
|---|---|---|
| EP | 0 757 317 A2 | 2/1997 |
| JP | H0628315 | 2/1994 |

(Continued)

OTHER PUBLICATIONS

"The Compaq Enterprise Network Storage Architecture: An Overview", source(s): Compaq, May 2000, pp. 1-22.

(Continued)

*Primary Examiner* — Jeffrey A Burke
(74) *Attorney, Agent, or Firm* — Winthrop & Weinstine, P.A.

(57) ABSTRACT

A process of determining explicitly free data space in computer data storage systems with implicitly allocated data space through the use of information provided by a hosting computer system with knowledge of what space allocated is currently being used at the time of a query, is provided. In one embodiment, a File System ("FS") is asked to identify clusters no longer in use which is then mapped to physical disks as visible to an Operating System ("OS"). The physical disks are mapped to simulated/virtualized volumes presented by a storage subsystem. By using server information regarding the FS, for those pages that are no longer in use, point in time copy ("PITC") pages are marked for future PITC and will not be coalesced forward, thereby saving significant storage.

11 Claims, 2 Drawing Sheets

(56) References Cited

U.S. PATENT DOCUMENTS

| | | |
|---|---|---|
| 6,415,296 B1 | 7/2002 | Challener et al. |
| 6,560,615 B1 | 5/2003 | Zayas et al. |
| 6,611,897 B2 | 8/2003 | Komachiya et al. |
| 6,618,794 B1 | 9/2003 | Sicola et al. |
| 6,636,778 B2 | 10/2003 | Basham et al. |
| 6,718,436 B2 | 4/2004 | Kim et al. |
| 6,799,258 B1 | 9/2004 | Linde |
| 6,839,827 B1 | 1/2005 | Beardsley et al. |
| 6,857,057 B2 | 2/2005 | Nelson et al. |
| 6,857,059 B2 * | 2/2005 | Karpoff et al. ............... 711/209 |
| 6,862,609 B2 | 3/2005 | Merkey |
| 6,877,109 B2 | 4/2005 | Delaney et al. |
| 6,904,599 B1 | 6/2005 | Cabrera et al. |
| 6,915,241 B2 | 7/2005 | Kohlmorgen et al. |
| 6,938,123 B2 | 8/2005 | Willis et al. |
| 6,948,038 B2 | 9/2005 | Berkowitz et al. |
| 6,952,794 B2 | 10/2005 | Lu |
| 6,957,294 B1 | 10/2005 | Saunders et al. |
| 6,957,362 B2 | 10/2005 | Armangau |
| 6,959,313 B2 * | 10/2005 | Kapoor et al. ............... 707/649 |
| 6,981,114 B1 | 12/2005 | Wu et al. |
| 7,000,069 B2 | 2/2006 | Bruning et al. |
| 7,017,076 B2 | 3/2006 | Ohno et al. |
| 7,039,778 B2 | 5/2006 | Yamasaki |
| 7,051,182 B2 | 5/2006 | Blumenau et al. |
| 7,058,788 B2 | 6/2006 | Niles et al. |
| 7,072,916 B1 * | 7/2006 | Lewis et al. ............... 1/1 |
| 7,085,899 B2 | 8/2006 | Kim et al. |
| 7,085,956 B2 | 8/2006 | Petersen et al. |
| 7,089,395 B2 | 8/2006 | Jacobson et al. |
| 7,107,417 B2 | 9/2006 | Gibble et al. |
| 7,111,147 B1 | 9/2006 | Strange et al. |
| 7,133,884 B1 | 11/2006 | Murley et al. |
| 7,162,599 B2 | 1/2007 | Berkowitz et al. |
| 7,191,304 B1 | 3/2007 | Cameron et al. |
| 7,379,954 B2 * | 5/2008 | Shoens ............... 1/1 |
| 7,603,532 B2 * | 10/2009 | Rajan et al. ............... 711/166 |
| 2002/0007438 A1 | 1/2002 | Lee |
| 2002/0129214 A1 | 9/2002 | Sarkar |
| 2003/0005248 A1 | 1/2003 | Selkirk et al. |
| 2003/0009619 A1 | 1/2003 | Kano et al. |
| 2003/0065901 A1 | 4/2003 | Krishnamurthy |
| 2003/0110263 A1 | 6/2003 | Shillo |
| 2003/0182503 A1 | 9/2003 | Leong et al. |
| 2004/0030822 A1 | 2/2004 | Rajan et al. |
| 2004/0030951 A1 | 2/2004 | Armangau |
| 2004/0107222 A1 | 6/2004 | Venkatesh et al. |
| 2004/0117572 A1 | 6/2004 | Welsh et al. |
| 2004/0133742 A1 | 7/2004 | Vasudevan et al. |
| 2004/0172577 A1 | 9/2004 | Tan et al. |
| 2005/0010618 A1 | 1/2005 | Hayden |
| 2005/0010731 A1 | 1/2005 | Zalewski et al. |
| 2005/0262325 A1 | 11/2005 | Shmueli et al. |
| 2006/0031287 A1 | 2/2006 | Ulrich et al. |
| 2006/0085471 A1 | 4/2006 | Rajan et al. |
| 2006/0107006 A1 | 5/2006 | Green et al. |
| 2006/0206536 A1 * | 9/2006 | Sawdon et al. ............... 707/200 |
| 2006/0271604 A1 * | 11/2006 | Shoens ............... 707/201 |
| 2007/0016749 A1 | 1/2007 | Nakamura et al. |
| 2007/0016754 A1 | 1/2007 | Testardi |
| 2007/0260830 A1 * | 11/2007 | Faibish et al. ............... 711/162 |
| 2007/0266066 A1 * | 11/2007 | Kapoor et al. ............... 707/205 |
| 2008/0005468 A1 * | 1/2008 | Faibish et al. ............... 711/114 |
| 2008/0288546 A1 * | 11/2008 | Adkins et al. ............... 707/200 |

FOREIGN PATENT DOCUMENTS

| | | |
|---|---|---|
| JP | 07200367 | 8/1995 |
| JP | 2005301628 | 10/2005 |
| JP | 2007502470 | 2/2007 |
| JP | 2007102692 | 4/2007 |
| JP | 2007133478 | 5/2007 |
| WO | WO 00/13077 A2 | 3/2000 |
| WO | WO 2005/017737 A2 | 2/2005 |
| WO | 2006044706 | 4/2006 |
| WO | 2007048726 | 5/2007 |

OTHER PUBLICATIONS

Massiglia, P., "Chapter 11: Dynamic Data Mapping", The RAIDbook. A Source for RAID Technology, Feb. 1997; pp. 197-208.
Wilkes, John, et al., "The HP AutoRAID Hierarchical Storage System", ACM Transactions on Computer Systems, Association for Computing Machinery, ACM Transactions on Computer Systems, vol. 14, No. 1, Feb. 1996; pp. 108-136.
Supplemental Search Report from European Patent Office issued on Aug. 4, 2011 in connection with European Patent No. 08771751.8. 10 pages.

* cited by examiner

DATA STORAGE SPACE RECOVERY SYSTEM AND METHOD

CROSS-REFERENCE TO RELATED APPLICATION(S)

This application relates to co-pending U.S. patent application Ser. No. 10/918,329, filed Aug. 13, 2004, entitled "Virtual Disk Drive System and Method"; subject matter of which is incorporated herein by reference.

FIELD OF THE INVENTION

The present invention relates to a system and method of determining explicitly free data space in computer data storage systems with implicitly allocated data space through the use of information provided by a hosting computer system with knowledge of what space allocated is currently being used at the time of a query. By reducing the total amount of storage required, significant cost savings over the lifetime of any given data may be achieved.

BACKGROUND OF THE INVENTION

Every year increasing amounts of data are required to be stored and transmitted for various purposes, including business practices and compliance with various laws. The media upon which this data is recorded has a price in dollars to acquire, a price to manage in manpower time, and a price to provide infrastructure such as power and cooling and/or other factors. It is desirable to reduce the cost of all of these factors. It is generally accepted that the cost to manage and provide such infrastructure is a multiple of the cost to acquire the storage media. By reducing the amount of media, other infrastructure costs may be further reduced. The present invention provides means by which data storage and related media may be conserved, recycled, or reused, thereby reducing the total cost of ownership for data storage.

It has previously been demonstrated that it is possible to build a storage subsystem in which all of the physical storage is initially allocated to a pool, examples of which are discussed in the co-pending U.S. patent application Ser. No. 10/918,329, filed Aug. 13, 2004, entitled "Virtual Disk Drive System and Method." That pool may then be allocated on demand to other entities accessible by a computing entity for the use of that entity for data storage. The allocation of storage from the pool to the computing entity in the field of the present invention is commonly referred to as "thin provisioning." This method of only allocating storage on demand uses the implication that storage is in use by the computing entity in that if the computing entity writes data, it intends to store that data for later retrieval. By only allocating storage identified by those specific operations, a significant amount of storage that is not and may never be in use by a traditional storage subsystem may be omitted from the system as a whole, thereby reducing the cost to acquire, maintain, etc.

However, in standard protocols, it is not possible for a computing entity to communicate to a storage subsystem that a specific area which has previously had data stored to it is no longer in use and can now be reused or otherwise released. This data space may have been used for temporary storage, or may simply be no longer valuable enough to retain for further use. Since there is no means available to identify the area that is no longer in use from the perspective of the storage subsystem alone, the data space continues to be maintained by the storage subsystem. In other words, there is no implicit means that can logically exist by which to determine with absolute certainty without examining the data itself to free the previously implicitly allocated storage. Also, it is computationally intensive for the storage subsystem to examine the contents of all data stored by the computing entity. Therefore, the storage system suffers a very severe performance impact, while trying to keep abreast of technology changes in operating or file systems and all possible applications which may use a storage subsystem.

Overall, it is desirable to know exactly which blocks are in use, and which are not for any operating system, and any type of file system to help make thin provisioning as efficient as possible. No standard exists for a user of block storage to indicate to the storage unit that a block is "not in use." For traditional storage devices, this information has been entirely irrelevant because one physical block is mapped to each addressable block on the storage device by physical representation. In nearly all storage systems incorporating more than one disk device, any given addressable block may in fact be mapped to nearly any (and sometimes more than one) physical block on one or more physical disk devices. With a fully virtualized, thin provisioned storage system, the only information about what blocks are in use is collected implicitly—if a block is written to, it is assumed to be in use. This is an inherently safe assumption. In the case of thin provisioning, physical blocks are allocated to map to user addressable blocks on an as needed basis, based on the user writing to a given addressable block. "Reads" from blocks that have never been written may return dummy data, usually data composed of all zeros, and of the total length requested. The only method in which a block may be released for reuse in this embodiment is if a PITC is made, and the given logical addressable block is again written to, and the previous PITC expires. This, again, implicitly indicates that the block previously allocated is no longer necessary for the integrity of the addressable storage and can be reallocated as necessary, potentially to other volumes.

Certain conditions can cause an abundance of unused addressable blocks in any FS. An extreme example of this would be creating a single very large file that encompasses nearly the entire volume, then deleting the file. The storage subsystem will implicitly allocate the storage required for every write made by the file system, in this case, those to encompass the entire volume. After the file is deleted, the vast majority of the space allocated by the storage subsystem is not needed, but the storage space cannot be released implicitly, thereby consuming resources. Over time, small allocations and de-allocations at the application or file system level can lead to the same result.

Thus, the existing thin provisioning process in a data storage system is hampered by file system operations of an operating system. These file systems do not reallocate freed space, but rather allocate previously unused space to new file writes, i.e. new file writing operations. This method of operation results in large amount of space that have been previously written to in a given partition that are no longer actually storing usable data for the file system. Because the data storage system has no way of knowing what logic block addresses ("LBAs") are no longer in use by the file system layered upon the block storage provided by the data storage system, over time these now unused blocks will accumulate. This accumulation will eventually require that every point in time copy ("PITC") taken will refer to previous pages in a page pool, even though that storage is not actually in use.

Because more and more pages are declared "in use" that are not actually in use, operations such as copies, replication and other data movement will take a greater amount of time, and more storage space will be consumed, potentially at all tiers, thereby defeating many space advantages of thin provisioning. One example is that a 1 gb file is written and a corresponding new volume is allocated, and then the 1 gb file is deleted. In the storage subsystem, 1 gb of pages are still allocated in the active PITC and will be carried into the next PITC and so on. Pages may be replaced in later PITCs, however, in the existing system, there is no way of releasing pages that the file system has declared no longer in use. The result is if this supposedly empty volume is copied using internal tools, 1 gb of pages will be consumed in the new copy, even though the volume is empty.

Accordingly, a process of determining when implicitly allocated storage is no longer in use by a computing entity and can be freed for other uses, is desired.

BRIEF SUMMARY OF THE INVENTION

The present invention provides a system and method of determining explicitly free data space in computer data storage systems with implicitly allocated data space through the use of information provided by a hosting computer system with knowledge of what space allocated is currently being used at the time of a query. By reducing the total amount of storage required, significant cost savings over the lifetime of any given data may be achieved.

In one embodiment of the present invention, a process is provided to determine when implicitly allocated storage is no longer in use by a computing entity and can be freed for other uses. One of the advantages of the present invention is that it reduces the total amount of data storage required, which reduces the other resources, such as bandwidth required to copy data from one entity to another, to store additional copies of the data, and a corresponding reduction in the use of supporting infrastructure including space, time to transport and manage the storage, as well as power supplied to the storage devices and other potentially valuable resources.

As it will be realized, the embodiment of the present invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
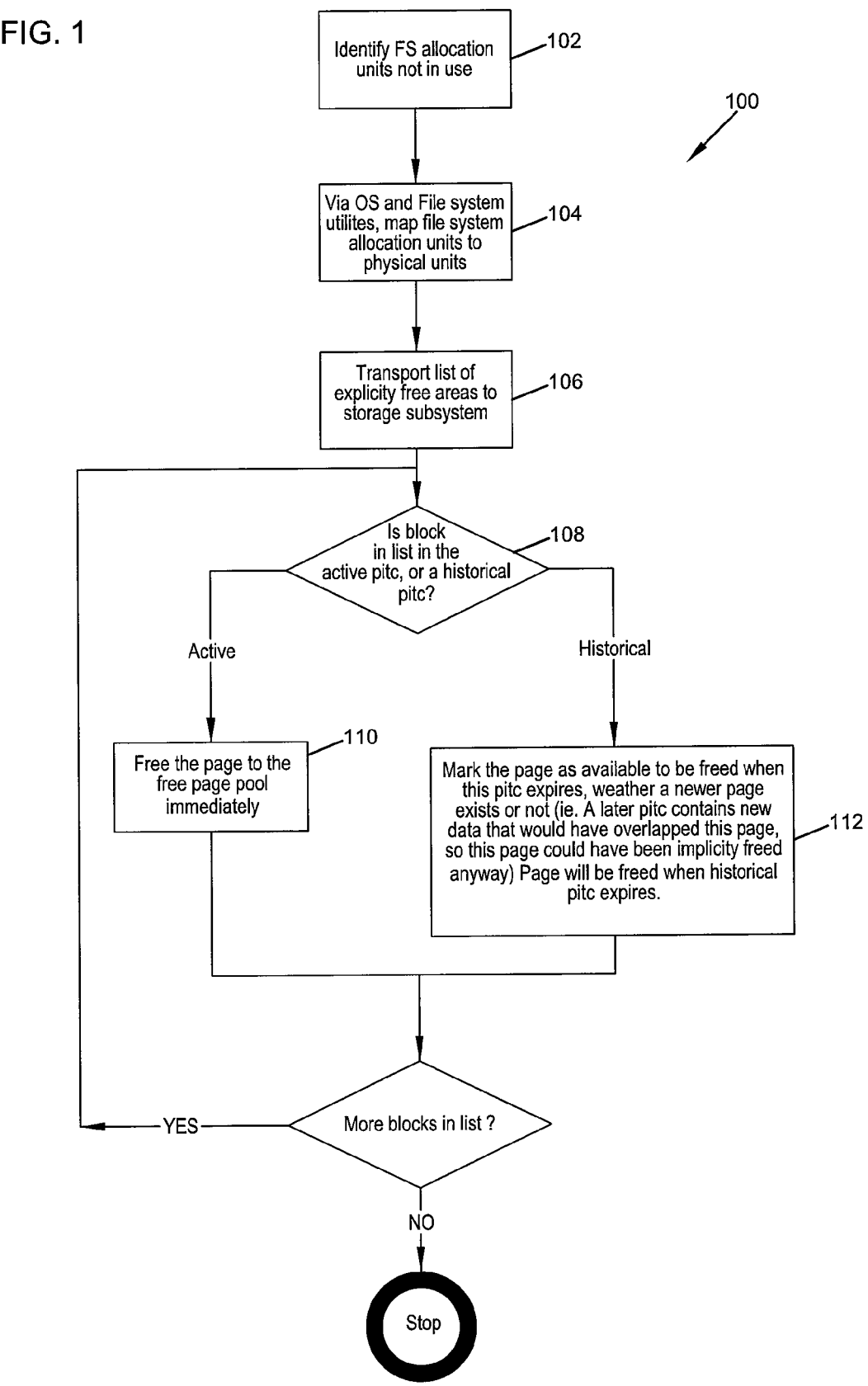
FIG. 1 illustrates a flow chart of one exemplary process of data storage space recovery in accordance with the principles of the present invention.
Figure 2:
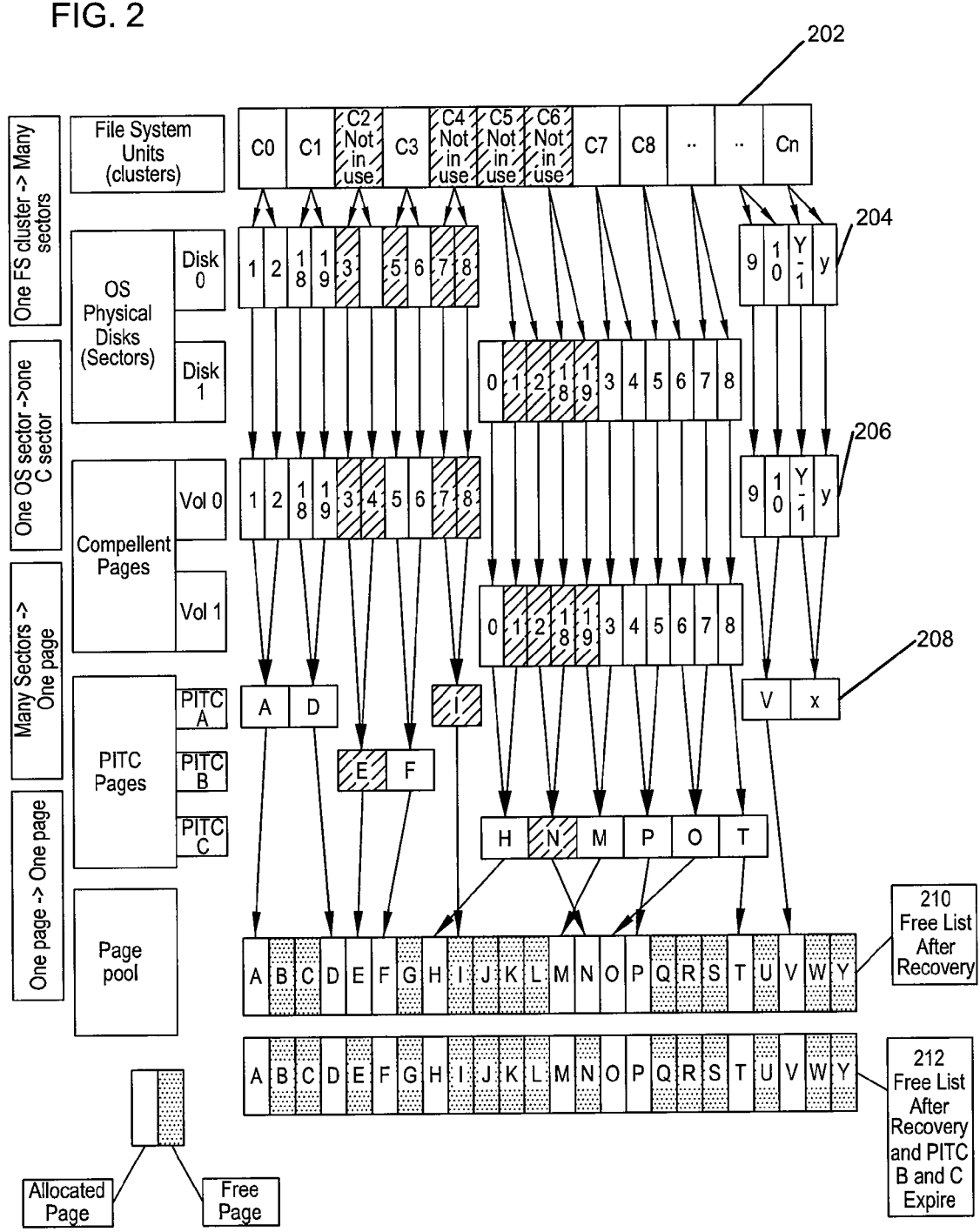
FIG. 2 illustrates one exemplary file system units/sectors/clusters to pagepool mapping process to explicitly free data space in computer data storage system in accordance with the principles of the present invention.

FIGS. 1 and 2 illustrate a process of determining explicitly free data space in a computer data storage system with implicitly allocated data space through the use of information provided by a hosting computer system with knowledge of what space allocated is currently being used at the time of a query.

A hosting computer system of the present invention may include one or more computing entities (sometimes referred to as hosts or servers), which are connected by means, such as Fiber Channel, SCSI, or other standard storage protocol, to one or more data storage subsystems, each of which simulates or maps to one or more physical storage volumes. One embodiment of the data storage subsystem is described in co-pending patent application, U.S. patent application Ser. No. 10/918,329, filed Aug. 13, 2004, entitled "Virtual Disk Drive System and Method", subject matter of which is incorporated by reference. The host or server includes an operating system ("OS"), a part of which is referred to as a File System ("FS") having a plurality of units/sectors/clusters as shown in FIG. 2.

The host or server generally has no means to determine the difference between a simulated/virtualized volume and a traditional storage volume limited to a single physical disk. The data storage subsystem provides abstraction between storage unit sectors as viewed by the host or server to those used for data storage which may be spread across many disks using redundant storage, such as RAID or other non-redundant methods. The storage subsystem abstracts storage that is allocated via RAID methods into units called pages which contain many sectors. This abstraction allows for simplified internal management of data allocation between the virtual volume and the actual disk storage, and the detailed implementation is described in the co-pending U.S. patent application Ser. No. 10/918,329, filed Aug. 13, 2004, entitled "Virtual Disk Drive System and Method".

Accordingly, in FIG. 1, a process 100 of determining explicitly free data space in the computer data storage system with implicitly allocated data space starts with a step 102 of identifying FS allocation units/sectors/clusters. The FS units/sectors/clusters are allocated and mapped with OS physical disk units/sectors in a step 104. In step 106, an unused block list of explicitly free areas is transported to the storage subsystem. Upon arrival at the storage subsystem the unused block is trimmed to only include full pages. A page must be totally unused to make it eligible to be freed. In step 108, a controller (not shown) may modify the active PITC which tracks the changes to the volume for a given time period. In Step 108, a controller (not shown) determines whether each block in the unused block list is in the active point-in-time copy ("PITC") or a historical PITC, wherein the active PITC is a storage area or page that has been used and is not in use, whereas a historical PITC is a storage area or page that has been used and will potentially be freed when the PITC expires. If the block in the unused block list is an active PITC, then the controller, in step 110, returns the page to a free list. A pagepool 210 in FIG. 2 illustrates a free list of storage space. A pagepool 212 in FIG. 2 illustrates the free list after the page is returned.

If the block in the free list is a historical PITC, then the controller, in step 112, marks the page in the active PITC as available to be freed when the frozen PITC owning the pages is expired into the PITC with the marked page. (i.e., a later PITC may contain new data that would have overlapped this page, so this page could have been implicitly freed anyway), whereby the page will be freed when historical PITC expires. The data within a historical PITC is read-only and may not be altered during its lifetime. This includes write I/O to the data page, as well as returning the page to the free list. Once the historical PITC is expired its pages may be returned to the free list. Next, the controller determines whether there is another block in the list. If so, the process 100 returns to step 108, and so on. If there is no block in the list, the process 100 ends. A pagepool 212 in FIG. 2 illustrates the free list of pages after PITC B and C expire from the system. Pages E and N are freed when PITC B and C expire from the system. As long as the PITC exists and provides a valid recovery point, it needs to retain all of its pages.

In a typical case without the above process 100 of the present invention, page 6 in PITC A, page 1 in PITC B, and pages 1, 2 in PITC C, as shown in FIG. 2, may have been previously referenced, and therefore they must be carried forward as PITC coalesce, and they are implicitly free space yet the server or host has no way of knowing. As illustrated in FIG. 2, the FS is no longer using these storage area as indicated by the FS cluster map 202, i.e. clusters 2,4,5,6 are no longer in use, it is simply wasted space.

To release or free these space, the FS is asked to identify clusters in use and not in use which are shown in cluster map 202. This identifies clusters 2,4,5,6 as no longer in use.

Then, the FS is asked to map to clusters not in use (2,4,5,6) to disks as visible to the OS. This provides the mapping of cluster 2 to sectors 3,4 on disk 0, cluster 4 to sectors 7,8 on disk 0, cluster 5 to sectors 18 and 19 on disk 1, and cluster 6 to sectors 1 and 2 on disk 1. It is appreciated that the sector numbers are used hereby for the illustration purpose.

Because the physical disks as viewed by the OS are identical to the simulated/virtualized volumes presented by the storage subsystem by design, there is a one-to-one mapping of sectors between the OS view 204 of the disks and the storage subsystem volumes 206.

The sector addresses of the sectors that are identified as not in use can now be resolved to the corresponding PITC the data is mapped from, PITC A, PITC B, and PITC C, in 208. Each PITC page normally contains great many sectors—sometimes thousands, and in this example for the illustration purpose, each page contains 2 sectors. Accordingly, Volume 0 sectors 3 and 4 are mapped to PITC B page 1, Volume 0 sectors 7 and 8 are mapped to PITC A page 6, and so on. At this point, the pages that cannot be freed because other portions of the page are in use, can also be resolved. For example, in FIG. 2, Volume 1, sector 19 is mapped to PITC C, page 5, which is also and still in use by sector 3 of Volume 1. In this case, PITC C, page 5 is not freed at this point.

By using the server information regarding the FS, the PITC pages shown in 208 are marked as no longer in use for future PITCs and will not be coalesced forward beyond the point of the space recovery, thereby saving significant storage.

It is noted that the above example does not show how FS clusters that have never been used are mapped to "zero data." It is appreciated that even though the process of the present invention identifies and resolves the clusters that have previously contained data and no longer do, e.g. a file was deleted or moved, and so forth, steps can be made to identify and resolve clusters that include some clusters that have never been used.

In summary, by examining the FS, certain identified pages can be removed from later PITCs, returning certain pages to the storage pagepool during future operations. In the present invention, the FS is free to map whatever unit of allocation is used by the FS to sectors and physical disks in whatever manner it desires. Thus, one of the keys to recover space that is no longer in use is to query the FS to determine which space is actually in use and at what physical location. Knowing this information, mapping from FS allocation units to virtual storage subsystem volumes, and from there, pages, can be performed. Pages that were implicitly identified as in use can be explicitly determined to be free. This information can be used to optimize space usage in the appropriate PITC.

What is claimed is:

1. A method of determining explicitly free data storage space in a data storage subsystem that is implicitly allocated to a host file system, the method comprising:

querying the host file system to identify file system storage units that are no longer in use by the host file system, wherein the file system storage units correspond to implicitly allocated storage space in the data storage subsystem by virtue of the file system storage units having been previously allocated to the host file system, resulting in such allocated storage space being free for reuse in actuality yet still appearing, from the perspective of the data storage subsystem, as in use by the host file system;

receiving a list of the identified unused file system storage units from the host file system;

mapping each unused file system storage unit of the list of identified unused file system storage units to a corresponding implicitly allocated data storage space in the data storage subsystem; and explicitly freeing the corresponding implicitly allocated data storage space based on a determination of whether the corresponding implicitly allocated data storage space is in an active point in time copy page or a historical point in time copy page, such that the explicitly free data storage space no longer appears in use by the host file system from the perspective of the data storage subsystem.

2. The method of claim 1, wherein the corresponding implicitly allocated data storage space in an active point in time copy page is freed into a free page pool, thereby becoming explicitly free.

3. The method of claim 1, wherein the corresponding implicitly allocated data storage space in a historical point in time copy page is marked to be freed into a free page pool when the historical point in time copy page expires, thereby becoming explicitly free once the historical point in time copy page expires.

4. The method of claim 1, wherein the file system is connected to the data storage subsystem by Fiber Channel.

5. The method of claim 1, wherein the file system is connected to the data storage subsystem by SCSI.

6. The method of claim 1, wherein the list of unused file system storage units is trimmed to include only storage units that correspond to full pages of the data storage subsystem.

7. The method of claim 1, wherein the data storage subsystem utilizes thin provisioning.

8. A data storage subsystem in operable communication with a host file system, the data storage subsystem comprising a computer-readable data storage medium and a controller, the controller configured to:

allocate data storage space of the computer-readable data storage medium to the host file system, wherein by virtue of the allocation of the data storage space, the allocated portions of the data storage space appear, from the perspective of the controller, to be in use by the host file system even where any of such allocated portions are free for reuse in actuality, being no longer in use by the host file system;

query the host file system to identify free portions of the allocated data storage space which are no longer in use by the host file system;

receive, from the host file system, a list of the identified free portions of the data storage space no longer in use by the host file system;

map the data storage space identified in the list of free portions of the data storage space to corresponding portions of data storage space in the computer-readable data storage medium; and explicitly free the corresponding portion of data storage space in the computer-readable data storage medium based on a determination of whether the corresponding portion of data storage space is in an active point in time copy page or a historical point in time copy page, such that explicitly free portions of data storage space no longer appear in use by the host file system from the perspective of the controller.

9. The data storage subsystem of claim 8, wherein the corresponding portions of data storage space in an active point in time copy page are freed into a free page pool, thereby becoming explicitly free.

10. The data storage subsystem of claim 8, wherein the corresponding portions of data storage space in a historical point in time copy page are marked to be freed into a free page pool when the historical point in time copy page expires, thereby becoming explicitly free once the historical point in time copy page expires.

11. A method of determining explicitly free data storage space in a data storage subsystem that is implicitly allocated to a host file system, the method comprising:

receiving a list of file system storage units from the host file system that are no longer in use by the host file system, the file system storage units corresponding to implicitly allocated data storage space in the data storage subsystem by virtue of the file system storage units having been previously allocated to the host file system, resulting in such allocated storage space being free for reuse in actuality yet still appearing, from the perspective of the data storage subsystem, as in use by the host file system; and explicitly freeing the corresponding implicitly allocated data storage space based on a determination of whether the corresponding implicitly allocated data storage space is in an active point in time copy page or a historical point in time copy page, such that the explicitly free data storage space no longer appears in use by the host file system from the perspective of the data storage subsystem.

\* \* \* \* \*